Oct. 31, 1961 A. T. ROSSI 3,006,707
DISPENSING AND DISPLAY CABINET
Filed April 30, 1958 2 Sheets-Sheet 1

INVENTOR
ANTHONY T. ROSSI
BY
ATTORNEYS

Oct. 31, 1961 A. T. ROSSI 3,006,707
DISPENSING AND DISPLAY CABINET
Filed April 30, 1958 2 Sheets-Sheet 2

INVENTOR
ANTHONY T. ROSSI
BY
ATTORNEYS

United States Patent Office 3,006,707
Patented Oct. 31, 1961

3,006,707
DISPENSING AND DISPLAY CABINET
Anthony T. Rossi, 224 N. 18th St. W., Bradenton, Fla.
Filed Apr. 30, 1958, Ser. No. 732,015
7 Claims. (Cl. 312—121)

The present invention relates to the construction of a cabinet for storing a plurality of items, such as containers of fruit juice, for rendering those items readily accessible for individual removal from the cabinet by a prospective purchaser, and for displaying the items in such a way as to render their selection for purchase more probable than would otherwise be the case. The cabinet is specifically designed for use with products which must be maintained at a low temperature, but in its broader aspects is not limited thereto.

Retail selling has, particularly with the advent of the supermarket, undergone a quite radical change in the last several years. When a prospective purchaser is presented with a large number of competing products from which he may select the particular product which he will purchase, research has shown that the manner in which a given product is displayed in an effort to fix the attention of the purchaser on that product, and the ease with which the product may be removed from the display and placed in the shopping cart, are extremely significant factors. Many products, such as frozen foods, milk, and packaged perishable juices such as orange juice, must be refrigerated during the time that they are on display, but they must nevertheless be readily visible and readily available to the purchaser. Even such a simple operation as sliding back a panel may function to inhibit selection of a given product.

Another major problem which is presented is that of space. Retail establishments, even large supermarkets, have a limited amount of space available for the display of the many products which may be selected by the purchaser. The volume of sales which a given market can attain is limited by the number of persons who can shop there at the same time, and this is in turn determined by the amount of aisle space left between the rows of display racks or cabinets which carry the goods.

Accordingly, a display cabinet, to be useful and effective in the retail merchandising field, must show off the product to best advantage, must make it easy for the customer to obtain access to the product, must in some instances provide for maintaining the product at a reduced temperature, and must take up the minimum amount of space possible, with particular emphasis being placed on its not projecting out into the aisles of the market to an excessive degree.

The display cabinet cabinet of the present invention is designed to satisfy the above requirements in an exceptionally effective manner. The cabinet is most capacious, and therefore may hold a large number of articles at one time. Consequently it need not be refilled or restocked, even in a busy market, except at widely spaced intervals. It is well adapted to maintain the products at a low temperature, and is here specifically disclosed in that adaptation. It renders the products contained thereby readily visible and readily accessible. It is self-feeding—as products are removed from the point of access thereto other products will move down into position to be thereafter removed. Despite its capaciousness it has a minimal depth, and thus will not encroach upon aisle space. It may readily be restocked whenever that is necessary.

To the above ends the cabinet is so constructed as to provide a plurality of superposed compartments into which the desired objects, such as containers of orange juice or the like, may be received. The front of the cabinet is provided with apertures which communicate with the compartments and the compartments extend out forwardly through those apertures to a limited degree, the tops of the forwardly extending compartment portions being open and of a sufficient size so as to provide access to the objects contained within the compartments and to permit the objects to be freely removed from the compartments therethrough. These forwardly extending compartment portions, positioned one above the other, are inclined forwardly from the front wall proper of the cabinet. In this way even though a plurality of compartments are involved, they each extend out from the front of the cabinet proper for only a minimal distance, and for substantially the same distance. Consequently the overall depth of the cabinet, despite the provision for a plurality of compartments, is minimized. It is preferred that the compartments themselves be forwardly and downwardly inclined, thus providing a self-feeding feature. In order that the products contained within the compartments may be effectively displayed, the panels defining the fronts of the forwardly extending compartment portions are preferably transparent.

The cabinet may readily contain cooling equipment which will maintain the compartments, and hence the products contained therein, at a low temperature. Since the compartments are open only over a minimal area at the tops of the forwardly extending compartment portions, the refrigerating action is quite efficient.

Portions of the cabinet walls are movable out of their normal positions so as to expose the compartments for ready refilling. In one embodiment here disclosed, where the cabinet is designed to be fixed in position, the refilling of the compartments is accomplished at a front corner of the cabinet. In another of the illustrated embodiments, in which the cabinet is mounted to be moved forwardly from its normal position, the rear wall of the cabinet is openable for refilling purposes.

To the accomplishment of the above and to such other objects as may hereinafter appear, the present invention relates to the structure and arrangement of a dispensing and display cabinet as defined in the appended claims and as described in this specification, taken together with the accompanying drawings, in which:

Figure 2:
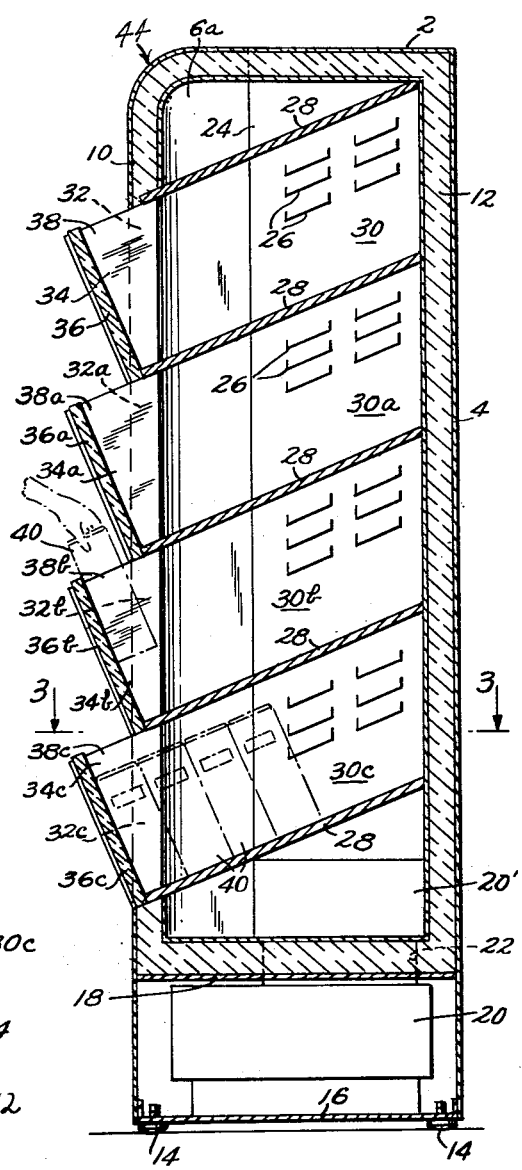
FIG. 2 is a cross sectional view taken along the line 2—2 of FIG. 1 but with the corner wall closed.
Figure 4:
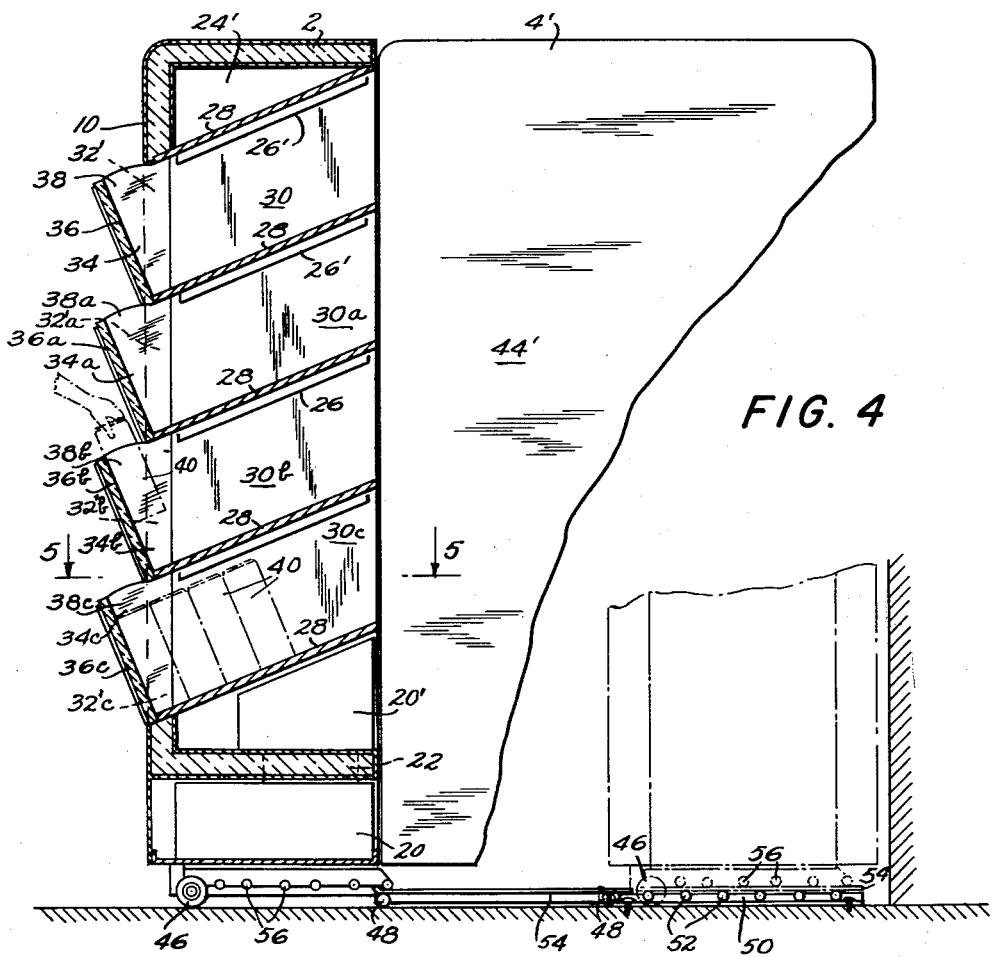
Figure 5:
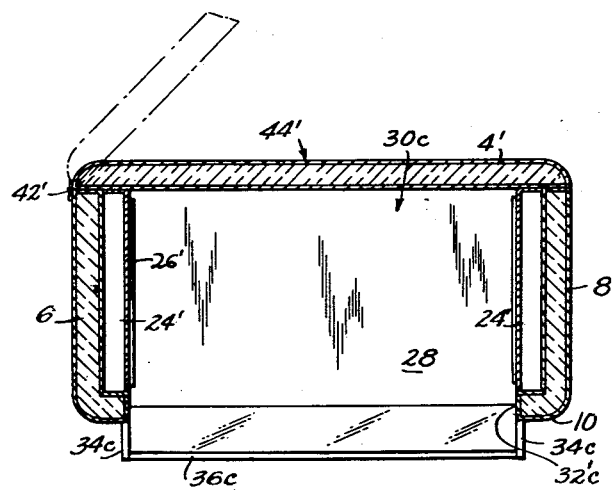

FIG. 4 is a cross sectional view similar to FIG. 2 but showing a second embodiment of the present invention in which the refilling is accomplished through the rear of the cabinet, the cabinet being movable forwardly when refilling is necessary, the cabinet being shown in solid lines in its forward position and with its back wall opened for refilling purposes, the cabinet being fragmentarily shown in broken lines in its normal position against the wall and with its back closed; and FIG. 5 is a cross sectional view taken along the line 5—5 of FIG. 4.

Figure 1:
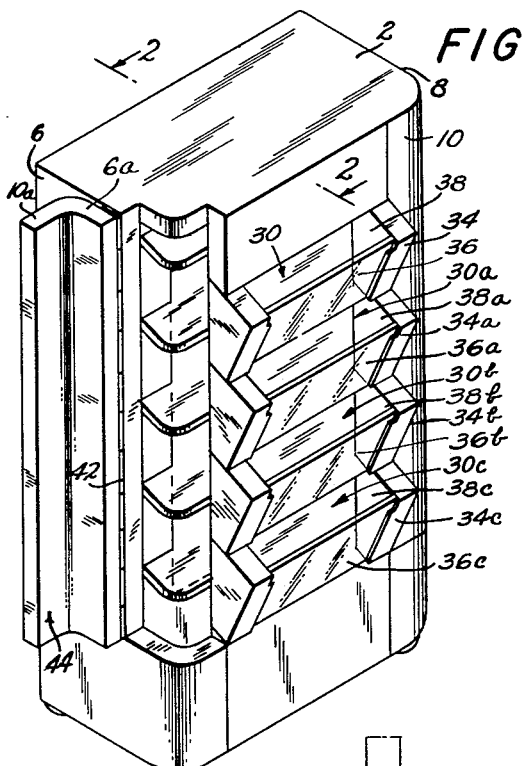
FIG. 1 is a three-quarter perspective view of one embodiment of the present invention, the movable corner wall of the cabinet being shown in open position, thereby providing access to the compartments for the filling thereof.
Figure 3:
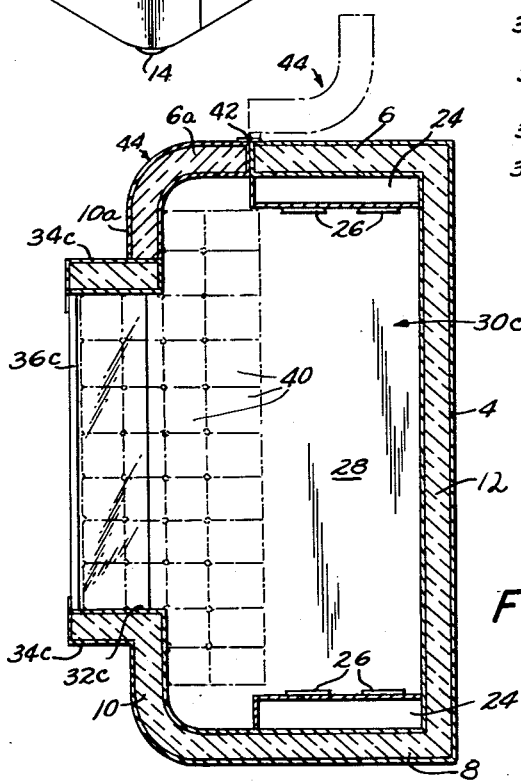
FIG. 3 is a cross sectional view taken along the line 3—3 of FIG. 2, the movable wall portion or door being shown in solid lines in its normal closed position and being shown in broken lines in its open position.

The cabinet disclosed in FIGS. 1–3 comprises a top wall 2, a rear wall 4, side walls 6 and 8 and a front wall 10 which, as here specifically disclosed, may include a filling of any appropriate heat insulating substance 12. Feet or casters 14 depend from a bracket 16 secured to the lower portions of the front and rear walls 4 and 10 respectively. A false bottom 18, also provided with a heat insulative filling 12, may be located above the bracket 16, a space being provided between the elements 16 and 18 within which suitable cooling equipment, generally designated 20, may be mounted. The precise nature of the cooling equipment forms no part of the present invention and it is therefore only representationally disclosed. It may, for example, comprise an electric motor driven refrigerating unit designed to cool air, which air is then adapted to be circulated through the cabinet. To this latter end it will be seen that the walls 2–10 and 18 define a thermally insulated space inside the cabinet to which the cooling equipment 20 communicates by means of structure passing through the wall 18, as at 22, and communicating with air ducts 24 located along the inside of the side walls 6 and 8, extending up to the top of the cabinet, and provided with louvers 26 spaced along the length thereof through which the cooled air can escape. If desired, portions of the cooling equipment, schematically designated 20', may be located above the wall 18.

Inside the cabinet, and between the walls 2 and 18, are a plurality of preferably forwardly and downwardly inclined shelves 28 extending from the rear wall 4 to the front wall 10 and subdividing the interior of the cabinet into a plurality of vertically aligned compartments 30, 30a, 30b and 30c in the form specifically disclosed. These compartments are closed within the cabinet at their tops and bottoms by the shelves 28, at their rear and sides by the cabinet walls 4, 6 and 8, and at their fronts partially by the cabinet front wall 10. However, the cabinet front wall 10 is provided with apertures generally designated 32, 32a, 32b, and 32c which communicate with the interior of the compartments 30, 30a, 30b and 30c respectively. In the form here specifically shown, with the compartments separated only by the shelves 28, the apertures 32—32c in the front cabinet wall 10 in fact comprise one single large aperture, but this is not essential to the instant invention. It will be noted that the louvers 26 from the cooling air ducts 24 are located along the ducts so as to provide for entry of cooling air into each of the compartments 30—30c.

The compartments 30—30c extend outwardly beyond the front walls 10, their outwardly extending portions comprising side panels 34—34c between which front panels 36—36c are received. The side panels 34—34c are substantially triangular in shape, the front panels 36—36c therefore being inclined forwardly relative to the front cabinet wall 10, open spaces 38—38c being provided therefor over the tops of the forwardly projecting portions of the compartments 30—30c. The size of these openings 38—38c is such as to readily permit the individual items adapted to be stored within the compartments 30, and here specifically shown in the form of cardboard containers 40 for orange juice or the like, to freely pass therethrough. It is preferred that the front panels 36—36c all be formed of glass or other transparent material, so that the juice containers 40 or other contents of the compartments may readily be seen from the exterior of the cabinet. When, as is here specifically disclosed, the compartments 30—30c themselves are forwardly and downwardly inclined, the front panels 36—36c thereof may make substantially a right angle with the shelves 28 defining the bottoms of those compartments.

As may be seen particularly from FIGS. 1 and 3, the apertures 32—32c in the front cabinet wall 10 have a width which exceeds the width of an individual juice container 40, thereby permitting a row of those containers to rest against the front compartment panels 36. In this way a very effective display is produced which invites selection in purchase. The width of the apertures 32—32c is, however, somewhat less than the overall width of the cabinet, although it is preferably a major proportion of that overall width in order to facilitate the display function.

A portion of the cabinet walls is openable in order to provide access to the compartments 30—30c in order that they may be stored with appropriate items. To this end, in the embodiment of FIGS. 1–3, the cooling duct 24 on at least one side of the cabinet does not extend the full depth of the cabinet, and a door is formed in the cabinet at a corner thereof, from a part 6a of the side wall 6 and a part 10a of the front wall 10, that door being hinged to the remainder of the side wall 6 at 42. The door is generally designated 44. When the door is open, as is shown in FIG. 1, the interior of the compartments 30—30c is widely exposed.

The embodiment of FIGS. 4 and 5 is essentially similar to that of the embodiment of FIGS. 1–3 insofar as the formation and location of the compartments are concerned, and corresponding elements are identified with corresponding reference numerals. The embodiment of FIGS. 4 and 5 differs, however, in that it provides for replenishment of the compartments 30—30c from the rear of the cabinet. To this end the entire rear wall 4' constitutes the access door 44' hinged to the side wall 6 at 42'. It therefore is permissible for the cooling ducts 24' to extend the full depth of the interior of the cabinet, and for the apertures 32'—32c' to extend for a greater proportion of the width of the front wall 10.

Since ordinarily a cabinet of this type will be located in the market up against the wall or backed upon other cabinets, means must be provided for moving it forwardly in order to provide space for the rear door 44 to open. To this end the cabinet of FIGS. 4 and 5 is provided with front and rear wheels 46 and 48 so that the cabinet may readily be moved between its normal display position and its refilling position. Since it is also desirable that cabinets of this type be accurately located, the mounting means for the cabinet of FIGS. 4 and 5 comprises a first rail 50 which is fixed to the floor and which is provided with rollers 52. An intermediate rail 54 is slidable over the rollers 52 between a contracted position directly above the fixed rail 50 and an extended position shown in FIG. 4 in which it extends forwardly from the fixed rail 50. The cabinet itself is provided with rollers 56 engaging the upper surface of the intermediate rail 54, the cabinet being slidable relative to the intermediate rail 54 between a contracted position in which the intermediate rail 54 is received substantially completely beneath the cabinet and the extended position shown in FIG. 4 in which the cabinet extends out forwardly from the intermediate rail 54. Thus when the cabinet is in its normal display position (shown in broken lines in FIG. 4) both the fixed rail 50 and the intermediate rail 54 are hidden beneath the cabinet. When the cabinet is to be refilled it is rolled out to its position shown in solid lines in FIG. 4, the connection between the intermediate rail 54 and the fixed rail 50 and the cabinet itself limiting the degree of this outward movement, the movement being sufficient to permit the rear door 44 to open and thus provide access to the compartments 30—30c.

When the compartments are stocked with the products 40 to be sold those products will be arranged in rows extending rearwardly from the front panels 36—36c of the compartments and at least the front row of articles will be inclined so as to rest on the front panels 36—36c. A pleasant and attractive display will thus be produced which will invite purchase. If a customer wishes to select one of the thus displayed items he need merely reach through one of the spaces 38—38c, grasp the desired object, and remove it from the cabinet. As he does so a new container 40 will slide down into the space vacated by the container 40 just removed. Since all of the compartments 30—30c extend forwardly from the front wall 10 of the cabinet to substantially the same degree, which is not appreciably greater than the depth of an individual container 40, it will be apparent that despite the capaciousness of the cabinet and its useability for the display of different items in the different compartments, the overall depth of the cabinet will be minimal. Moreover, when used as a refrigeration cabinet the refrigerating effect is exceptionally efficient, because the individual compartments 30—30c will be uninsulated only over a substantially limited area defined by the front panels 36, and because only a small space, defined by the openings 38—38c and limited by the spacing between the tops of the containers 40 and the top walls of the compartments in which they are located, will be provided through which warm air can enter or through which cold air can escape. Moreover, if care is taken when the compartments are refilled to put the new containers in the rear of the compartments (and this is almost automatic in the embodiment of FIGS. 4 and 5) there is little or no possibility that any given container can remain in its compartment for an excessively long period of time.

The construction above described will therefore be seen to be exceptionally effective for the storage and display of products, and particularly those which must be kept under refrigeration, in such a way as to encourage and facilitate selection and removal thereof. While but a limited number of embodiments of the present invention are here specifically disclosed, it will be apparent that many variations may be made, all within the scope of the invention as defined in the following claims.

I claim:

1. A dispensing and display cabinet comprising front, rear and side walls, means in said cabinet defining a plurality of compartments therein positioned one above the other, said front wall having apertures communicating with said compartments, said apertures having a width which is less than but a major proportion of the width of said front wall, said compartments being continuously inclined forwardly and downwardly from said rear wall toward said front wall, each of said compartments extending out forwardly through said apertures beyond said front wall to substantially the same degree as the other compartments, the tops of the forwardly extending portions of said compartments being open, thereby to provide access to the interior of said compartments, and refrigerating means to said cabinet including cooling ducts extending up through said compartments along the rear portions of said side walls, a portion of said cabinet including parts of said front wall to the side of said apertures and part of a side wall forward of said ducts being openable to provide access to said compartments for the refilling thereof.

2. A dispensing and display cabinet comprising enclosing walls including a front wall, a plurality of vertically spaced shelves within said cabinet, the forward ends on said shelves extending to but not substantially beyond said front wall, said shelves dividing the interior of said cabinet into a plurality of compartments, said front wall having apertures above each shelf and communicating with said compartments, panels extending upwardly at the forward ends of said shelves and extending outwardly through said front wall apertures, end walls substantially closing the side gaps between said panels and said cabinet walls, an opening remaining between said front wall and the upper edges of said panels and providing access to individual compartments through which items contained in said compartments may be individually removed, said apertures and said panels having a width less than the width of said shelves, a portion of said cabinet walls laterally outwardly spaced from said apertures being openable to provide access to said compartments for the refilling thereof.

3. The cabinet of claim 2, in which said openable portion is formed partly in said front wall and partly in a side wall of said cabinet.

4. A dispensing and display cabinet comprising enclosing walls including a front wall, a plurality of vertically spaced shelves permanently secured within said cabinet, the forward ends of said shelves extending substantially to but not beyond said front wall, said shelves dividing the interior of said cabinet into a plurality of compartments, said front wall having apertures above each shelf and communicating with said compartments, panels extending upwardly at the forward ends of said shelves and extending outwardly through said front wall apertures, end walls of a height substantially equal to the spacing between said shelves substantially closing the side gaps between said panels and said cabinet walls, openings remaining between said front wall and the upper edges of said panels and providing access to individual compartments through which items contained in said compartments may be individually removed, said apertures and said panels having a width less than the width of said shelves, a portion of said cabinet walls laterally outwardly spaced from said apertures being openable to provide access to said compartments for the refilling thereof.

5. A dispensing and display cabinet comprising enclosing walls including a front wall, a plurality of vertically spaced and continuously forwardly and downwardly inclined shelves permanently secured within said cabinet, the forward ends of said shelves extending substantially to but not beyond said front wall and terminating substantially in the same vertical plane, said shelves dividing the interior of said cabinet into a plurality of compartments, said front wall having apertures above each shelf and communicating with said compartments, panels extending substantially perpendicular to said shelves upwardly at the forward end of said shelves and extending outwardly through said front wall apertures, end walls of a height substantially equal to the spacing between said shelves substantially closing the side gaps between said panels and said cabinets walls, openings remaining between said front wall and the upper edges of said panels and providing access to individual compartments through which items contained in said compartments may be individually removed, said apertures and said panels having a width less than the width of said shelves, a portion of said cabinet walls laterally outwardly spaced from said apertures being openable to provide access to said compartments for the refilling thereof.

6. The cabinet of claim 4, in which said cabinet walls are heat-insulative and in which means are provided for refrigerating the contents of said compartments, said refrigerating means comprising cooling ducts extending up inside said compartments along the side walls thereof and extending only part way toward the front wall of said cabinet, said openable portion of said cabinet walls being located forwardly of said ducts.

7. The cabinet of claim 5, in which said cabinet walls are heat-insulative and in which means are provided for refrigerating the contents of said compartments, said refrigerating means comprising cooling ducts extending up inside said compartments along the side walls thereof and extending only part way toward the front wall of said cabinet, said openable portion of said cabinet walls being located forwardly of said ducts.

References Cited in the file of this patent

UNITED STATES PATENTS

| | | |
|---|---|---|
| D. 114,172 | Brotzman et al. | Apr. 11, 1939 |
| 714,427 | Winters | Nov. 25, 1902 |
| 774,291 | Thorpe | Nov. 8, 1904 |
| 1,255,759 | Kibby | Feb. 5, 1918 |
| 1,281,923 | Fales | Oct. 15, 1918 |
| 1,458,953 | Robeson | June 19, 1923 |
| 2,182,116 | Copeman | Dec. 5, 1939 |
| 2,234,424 | Alley | Mar. 11, 1941 |
| 2,492,695 | Henderson | Dec. 27, 1949 |
| 2,499,089 | Brill | Feb. 28, 1950 |
| 2,503,635 | Rieth | Apr. 11, 1950 |
| 2,836,039 | Weber | May 27, 1958 |

FOREIGN PATENTS

| | | |
|---|---|---|
| 727,303 | Great Britain | Mar. 30, 1955 |